United States Patent
Kishore et al.

(10) Patent No.: US 7,593,924 B2
(45) Date of Patent: Sep. 22, 2009

(54) METHOD, SYSTEM, AND APPARATUS FOR RECEIVING AND RESPONDING TO KNOWLEDGE INTERCHANGE QUERIES

(75) Inventors: Ajitesh Kishore, Kirkland, WA (US); Sandeep Sahasrabudhe, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 10/945,149

(22) Filed: Sep. 20, 2004

(65) Prior Publication Data

US 2006/0064404 A1    Mar. 23, 2006

(51) Int. Cl.
*G06F 17/30* (2006.01)
(52) U.S. Cl. .............. 707/3; 707/6; 707/10; 707/103 R; 707/109; 706/46; 706/52; 706/55
(58) Field of Classification Search .................. 707/10, 707/3, 6, 104.1, 102, 103 R; 706/18, 46, 706/52, 55, 58, 59; 717/105, 109, 113
See application file for complete search history.

(56) References Cited

U.S. PATENT DOCUMENTS

| | | | |
|---|---|---|---|
| 5,717,923 A | 2/1998 | Dedrick | |
| 5,941,944 A | 8/1999 | Messerly | 709/203 |
| 6,021,403 A | 2/2000 | Horvitz et al. | 706/45 |
| 6,041,311 A | 3/2000 | Chislenko et al. | 705/27 |
| 6,049,777 A | 4/2000 | Sheena et al. | 705/10 |
| 6,078,928 A * | 6/2000 | Schnase et al. | 707/104.1 |
| 6,092,049 A | 7/2000 | Chislenko et al. | 705/10 |
| 6,233,570 B1 | 5/2001 | Horvitz et al. | 706/11 |
| 6,260,035 B1 | 7/2001 | Horvitz et al. | 706/60 |
| 6,262,730 B1 | 7/2001 | Horvitz et al. | 345/337 |
| 6,374,275 B2 * | 4/2002 | Wasilewski | 715/259 |
| 6,397,209 B1 * | 5/2002 | Reed et al. | 707/3 |
| 6,415,257 B1 * | 7/2002 | Junqua et al. | 704/275 |
| 6,421,655 B1 | 7/2002 | Horvitz et al. | 706/61 |
| 6,539,375 B2 | 3/2003 | Kawasaki | 707/5 |
| 6,701,362 B1 | 3/2004 | Subramonian et al. | 709/224 |

(Continued)

FOREIGN PATENT DOCUMENTS

EP    1 376 387 A2    1/2004

(Continued)

OTHER PUBLICATIONS

European Communication dated Oct. 23, 2006 cited in EP Application No. 05111509.5-1527.

(Continued)

*Primary Examiner*—Jean M Corrielus
(74) *Attorney, Agent, or Firm*—Merchant & Gould

(57) ABSTRACT

A method, system, and apparatus are provided for receiving and responding to knowledge interchange ("KI") queries. KI queries are search queries directed to database of KI profiles. A KI profile identifies the interests of a user, the individuals with which a user has communicated, and the topics on which communication with the user was made. KI profiles are received from a plurality of client computers and stored in a profile database. Out-of-process processing may be performed on the contents of the profile database. Requests may be received to query the profile database. In response to receiving such requests, the received queries may be executed over the profile database to identify search results. The search results may then be returned as a response to the query.

22 Claims, 10 Drawing Sheets

U.S. PATENT DOCUMENTS

| | | | |
|---|---|---|---|
| 6,746,120 B2* | 6/2004 | Broderick et al. | 351/177 |
| 6,834,195 B2 | 12/2004 | Brandenberg et al. | 455/456.3 |
| 6,853,982 B2* | 2/2005 | Smith et al. | 705/27 |
| 6,856,986 B1 | 2/2005 | Rossides | 707/1 |
| 7,013,308 B1* | 3/2006 | Tunstall-Pedoe | 707/104.1 |
| 7,120,695 B2 | 10/2006 | Nilsson et al. | 709/228 |
| 7,249,117 B2* | 7/2007 | Estes | 706/52 |
| 7,249,123 B2* | 7/2007 | Elder et al. | 707/3 |
| 7,359,894 B1* | 4/2008 | Liebman et al. | 707/3 |
| 7,424,701 B2* | 9/2008 | Kendall et al. | 717/105 |
| 2002/0124253 A1 | 9/2002 | Eyer et al. | 725/34 |
| 2002/0161764 A1 | 10/2002 | Sharo | 707/7 |
| 2003/0046401 A1 | 3/2003 | Abbott et al. | 709/228 |
| 2003/0063072 A1 | 4/2003 | Brandenberg et al. | 345/173 |
| 2003/0069877 A1 | 4/2003 | Grefenstette et al. | 707/2 |
| 2003/0126136 A1 | 7/2003 | Omoigui | 707/10 |
| 2003/0167324 A1 | 9/2003 | Farnham et al. | 709/224 |
| 2003/0182310 A1 | 9/2003 | Charnock et al. | 707/104.1 |
| 2004/0073918 A1 | 4/2004 | Ferman et al. | 725/34 |
| 2004/0078216 A1 | 4/2004 | Toto | 705/2 |
| 2006/0035632 A1 | 2/2006 | Sorvari et al. | 455/418 |
| 2006/0041505 A1 | 2/2006 | Enyart | 705/40 |
| 2006/0064431 A1 | 3/2006 | Kishore et al. | |
| 2006/0074863 A1 | 4/2006 | Kishore et al. | |

FOREIGN PATENT DOCUMENTS

| | | |
|---|---|---|
| EP | 1 587 009 A2 | 10/2005 |
| WO | WO 2004/038564 A1 | 5/2004 |

OTHER PUBLICATIONS

M. Brauer et al., "Open Office Specification 1.0", Online Publication, Mar. 22, 2004, http://www.oasis-open.org/committees/download.php/6037/office-spec-1.0-cd-1.pdf.

Anonymous, "Technical Note TN2073: Deconstructing a Keynote 1.x Document: Part One—Slides", Online Publication, May 20, 2003, http://developer.appl.com/technotes/tn2002/pdf/tn2073.pdf.

Anonymous, "Technical Note TN2067: About the Keynote XML File Format (APXL Schema)", Online Publication, Feb. 12, 2003, http://developer.appl.com/technotes/tn2002/pdf/tn2067.pdf.

Anonymous, "Mulberry Slideshow XML (v 2.1): A User's Guide", Online Publication, Dec. 7, 2001, http://www.mulberrytech.com/slideshow/Mulberry-slideshow.zip.

U.S. Office Action dated Jan. 12, 2007 cited in U.S. Appl. No. 10/945,198.

U.S. Office Action dated Feb. 6, 2008 cited in U.S. Appl. No. 10/945,198.

U.S. Final Office Action dated Jun. 23, 2008 cited in U.S. Appl. No. 10/945,500.

U.S. Final Office Action dated Jul. 5, 2007 cited in U.S. Appl. No. 10/945,500.

U.S. Final Office Action dated Jul. 10, 2007 cited in U.S. Appl. No. 10/945,198.

U.S. Final Office Action dated Aug. 1, 2008 cited in U.S. Appl. No. 10/945,198.

Chinese Official Action dated Jul. 4, 2008 cited in Chinese Application No. 200510092721.0.

Van der Aalst, Wil M.P.; Song, Minseok, "Mining Social Networks: Uncovering Interaction Patterns In Business Processes," *Business Process Management*, Second International Conference, BPM 2004, Potsdam, Germany, Jun 17-18, 2004 Proceedings, Jörg Desel, Barbara Pernici, Mathias Weske (Eds.), Springer-Verlag Berlin Heidelberg New York, 2004.

Yolum, Pinar; Singh, Munindar P., "Self-Organizing Referral Networks: A Process View of Trust and Authority," *Engineering Self-Organising Systems*, Nature-Inspired Approaches to Software Engineering, Giovanna Di Marzo Serugendo, Anthony Karageorgos, Omer F. Rana, Franco Zambonelli (Eds.), Springer-Verlag Berlin Heidelberg New York, 2004.

Albrecht, Steffen; Lübcke, Maren, "Communicational Patterns As Basis of Organizational Structures," *Regulated Agent-Based Social Systems*, First International Workshop, RASTA 2002, Bologna, Italy, Jul. 16, 202, Revised Selected and Invited Papers, Gabriela Lindemann, Daniel Moldt, Mario Paolucci (Eds.), Springer-Verlag Berlin Heidelberg New York, 2004.

U.S. Appl. No. 10/945,500 entitled "Method, System, and Apparatus for Creating a Knowledge Interchange Profile" filed Sep. 20, 2004.

U.S. Appl. No. 10/945,198 entitled "Method, System, and Apparatus for Maintaining User Privacy in a Knowledge Interchange System" filed Sep. 20, 2004.

European Communication dated Nov. 30, 2005.

Yuri Quintana, "Knowledge-Based Information Filtering of Financial Information," Proceedings of the National Online Meeting, May 13, 1997, pp. 279-285.

U.S. Office Action dated Dec. 7, 2006 cited in U.S. Appl. No. 10/945,500.

U.S. Office Action dated Dec. 13, 2007 cited in U.S. Appl. No. 10/945,500.

Chinese First Office Action dated Jan. 16, 2009 cited in Chinese Application No. 200510092455.1.

U.S. Office Action dated Feb. 4, 2009 cited in U.S. Appl. No. 10/945,500.

Chinese Second Office Action dated Mar. 13, 2009 cited in Application No. 200510092721.0.

Chinese Second Office Action dated Apr. 17, 2009 cited in Application No. 200510092455.1.

U.S. Office Action dated Mar. 18, 2009 cited in U.S. Appl. No. 10/945,198.

* cited by examiner

METHOD, SYSTEM, AND APPARATUS FOR RECEIVING AND RESPONDING TO KNOWLEDGE INTERCHANGE QUERIES

CROSS-REFERENCE TO RELATED APPLICATIONS

This application is related to concurrently filed U.S. patent applications entitled "Method, System, and Apparatus for Creating a Knowledge Interchange Profile" Ser. No. 10/945,500 and "Method, System, and Apparatus for Maintaining User Privacy in a Knowledge Interchange System" Ser. No. 10/945,198, which are expressly incorporated herein by reference.

BACKGROUND OF THE INVENTION

Large corporate enterprises generate enormous amounts of data. Data is generated in documents of all kinds, electronic mail messages, instant messages, and other types of communications. Due to the large quantity of data generated and the fact that the data is often stored in many disparate locations, it can be very difficult for an individual seeking data (a "seeker") to locate information of interest. This is due, in part, to the fact that the data is frequently not linked, such as with documents made available on the World Wide Web (the "Web").

Employees working within large corporate enterprises are also typically experts on a large number of topics both related an unrelated to the business of the enterprise. An expert is an individual that is likely to help a seeker locate information relating to a topic or to locate another person that may have information related to the topic. In addition to seeking information, a seeker may also be interested identifying and contacting an expert on a topic of interest. However, it is very difficult to determine who the experts are for a particular topic within a large enterprise that may include tens or even hundreds of thousands of employees.

Systems do exist for assisting in the process of locating an expert within a large enterprise. However, current systems suffer from a number of serious drawbacks that limit their usefulness. In particular, current systems tend to locate too few experts within a large population. As a result, the limited number of experts may be overwhelmed with a large number of requests for assistance. As a consequence of the large number of requests, the experts frequently withdraw from the expert program. This results in the system having even fewer experts and the problem is exacerbated.

It is with respect to these considerations and others that the various embodiments of the present invention have been made.

BRIEF SUMMARY OF THE INVENTION

In accordance with the present invention, the above and other problems are solved by a method, system, and apparatus for receiving and responding to knowledge interchange ("KI") queries. KI queries are search queries directed to a database of KI profiles. A KI profile identifies the interests of a user, the individuals with which a user has communicated, and the topics on which communication with the user was made. A KI profile may be generated for some or all of the users in an enterprise and utilized to locate individuals that may make a connection to experts within the enterprise ("connectors"), the experts themselves, and information that may be of interest to seekers.

According to one aspect of the invention a method is provided for receiving and responding to KI queries. According to the method, KI profiles are received from a plurality of client computers and stored in a profile database. Each KI profile includes one or more keywords that identify the interests of a user, one or more noun phrases that also identify the interests of a user, and one or more contacts which whom the user has communicated. Keywords and noun phrases may also be associated with each contact to identify the topics on which communication was made with each contact.

According to the method, out-of-process processing may be performed on the contents of the profile database to eliminate noise words. Noise words are words that are very common among users in a large disjointed population. Once the noise words have been removed, requests may be received to query the profile database. In response to receiving such requests, the received queries may be executed over the profile database to identify search results. The search results may then be returned as a response to the query.

According to one aspect of the invention, the request to query the profile database may take the form of a request to locate an individual that can assist with a particular topic. In this case, the profile database may be searched to identify individuals that are experts in the particular topic and that are within a predefined social distance from the user making the search query. Social distance indicates the number of individuals needed to connect any two individuals among a group of connected individuals. For instance, if a user named John Smith had a user named Bill Jones in a contact list in his personal information management program, the social distance between John Smith and Bill Jones would be one. If Bill Jones has a contact named Sue White in his contacts list, the social distance between John Smith and Sue White would be two.

According to another aspect of the invention, the request to query the profile database may take the form of a request to locate an individual that can make a connection to another individual within the profile database. In order to execute this type of query, the profile database may be searched to identify individuals that are within a predefined social distance from the user making the search query and that have the individual listed as a contact within their KI profile. The search results may then be returned as a response to the query.

According to yet another aspect of the invention, the request to query the profile database may take the form of a request to locate an individual that can make a connection to another individual that is located outside an enterprise. In order to perform this type of query, the profile database may be searched to identify individuals that have the individual listed as a contact within their KI profile. The search results may then be returned as a response to the query.

According to another aspect of the invention, a search may be performed to locate individuals with common interests and to determine what materials these individuals have been reading. In this case, the search request takes the form of a request to query the profile database to locate information consumed by other individuals having similar interests. In order to perform this query, the profile database is searched to identify individuals having similar interests as the user making the request. Thereafter, the profile database is searched to identify information consumed by the individuals having similar interests from the contents of their KI profile.

The invention may be implemented as a computer process, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
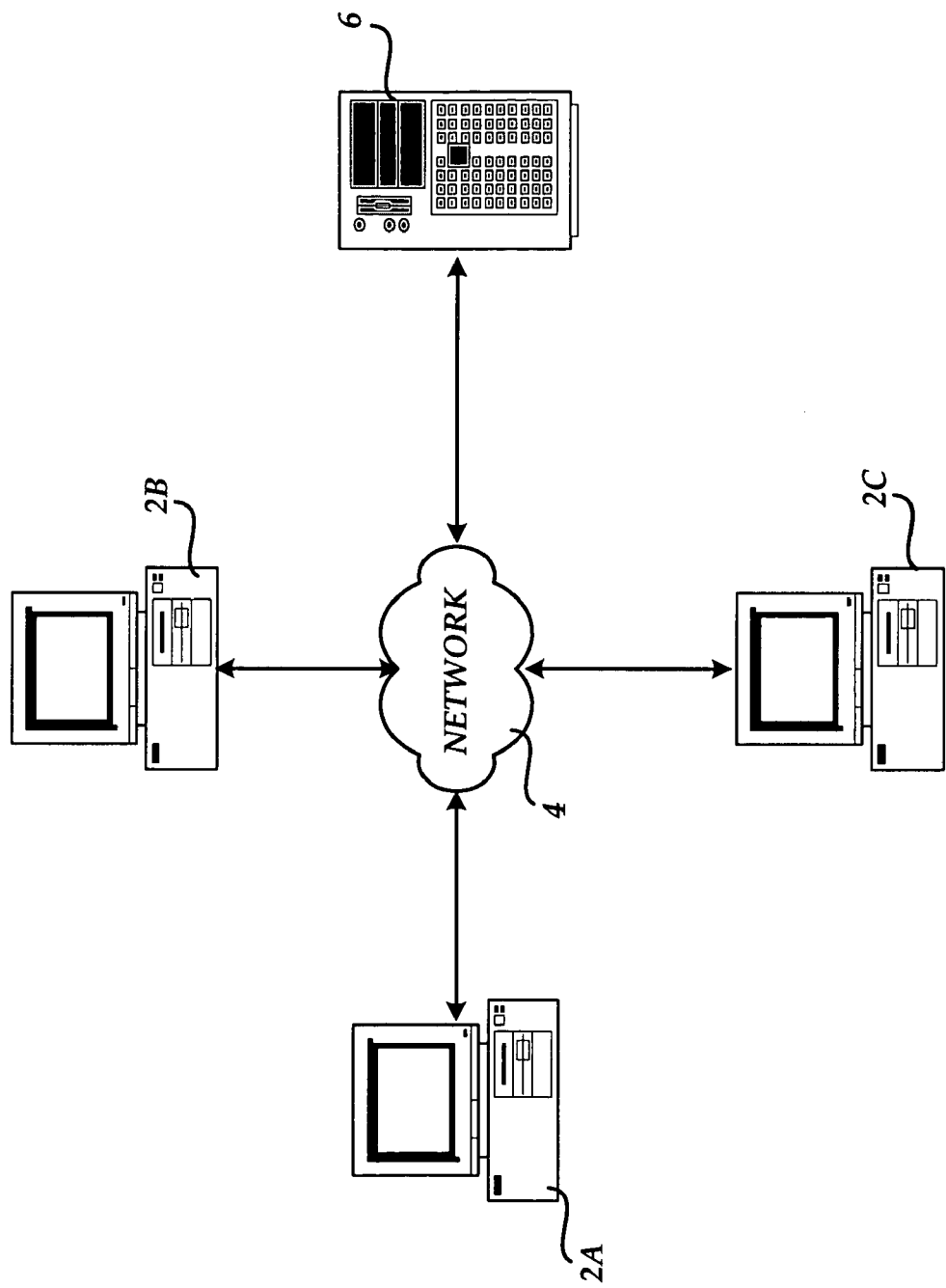
FIG. 1 is a computer network diagram illustrating aspects of an illustrative operating environment for the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. In particular, FIG. 1 illustrates aspects of a Knowledge Interchange ("KI") system provided according to the various embodiments of the invention. The KI system is a client-server system that facilitates the process of finding a person (a "connector" or "expert") who can help users ("seekers") connect with information or other people. As will be described herein, connectors have an additional burden imposed on them as a result of their participation in the KI system. In particular, they are the most important human elements of the system because they help other people. Because of this, the KI system provided herein provides the connectors control over many aspects of the operation of the KI system. For instance, connectors can choose to remain anonymous until they decide to help. Furthermore, if a connector decides not to help, their identity will never be revealed to seekers. As will be described herein, the KI system also helps connectors find their own data faster, thereby reducing the burden of helping others in some cases and helping themselves in some.

FIG. 1 shows an illustrative operating environment for a KI system provided by various embodiments of the invention. As shown in FIG. 1, a network 4 interconnects a number of client computers 2A-2C and a server computer 6. It should be appreciated that the network 4 may comprise any type of computing network, including a local area network ("LAN") or a wide area network ("WAN"), such as the Internet. The network 4 provides a medium for enabling communication between any number of client computers 2A-2C and the server computer 6. Although three client computers 2A-2C are shown in FIG. 1, it should be appreciated that the invention is contemplated for use with any number of client computers.

As will be described in greater detail below with respect to FIG. 2, each of the client computers 2A-2C comprises a general purpose desktop, laptop, tablet, or other type of computer capable of executing one or more application programs. In particular, according to the various embodiments of the invention, the computer 2 is operative to execute an operating system and one or more desktop application programs. For instance, the client computers 2A-2C are operative to execute word processing programs, spreadsheet programs, presentation programs, web browser programs, instant messaging client programs, personal information management programs, and other types of application programs.

As will also be described in greater detail below, the client computers 2A-2C are also operative to execute KI client programs that monitor the interaction of a user with the various programs executing on the client computers 2A-2C. Through the monitoring process, the KI client programs can identify items of interest to the user, such as electronic mail ("e-mail") messages, documents, web pages, and instant messages. Based on the items of interest, the KI client programs may create a KI profile that models the user's interests and contacts. The interests are captured in the form of keywords and noun phrases. Noun phrases are phrases made from nouns. With each keyword and contact, the KI client programs estimate the strength of the relationship measure. The KI client programs send the KI profile to the server computer 6 when it finds that the user is interested in new topics or contacts or if the user's affinity for a contact or topic changes significantly. The KI client programs also allow the user to edit this model and delete or add keywords or contacts. As will be described in greater detail below, the KI profiles from each of the client computers 2A-2C are aggregated and processed by the server computer 6. The aggregated profile data may then be utilized by the server computer 6 to respond to various types of queries for people or information.

Figure 2:
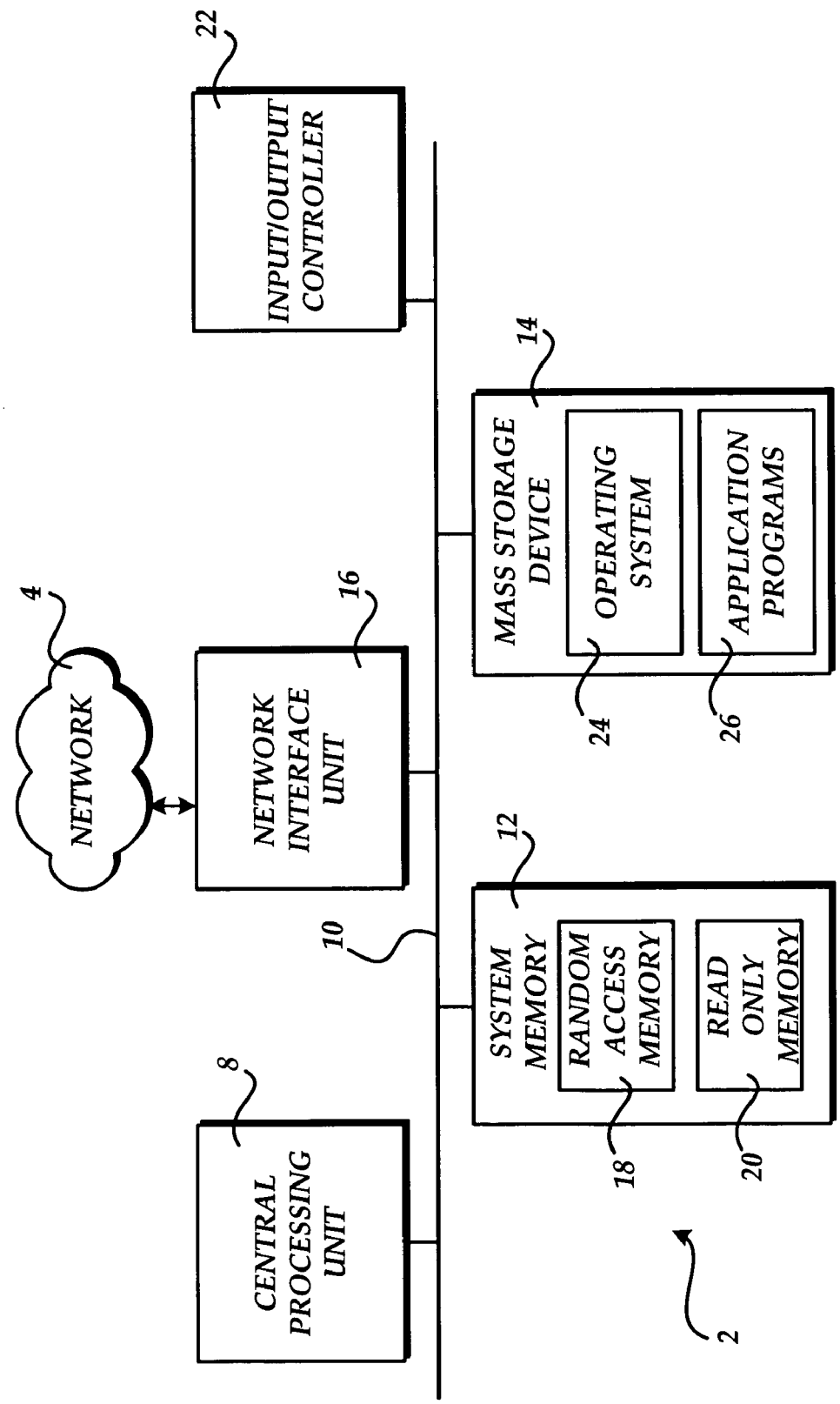
FIG. 2 is a computer system architecture diagram illustrating aspects of a computer system utilized in and provided by the various embodiments of the invention.

Referring now to FIG. 2, an illustrative computer architecture for a client computer 2 utilized in the various embodiments of the invention will be described. The computer architecture shown in FIG. 2 illustrates a conventional desktop, laptop, or tablet computer, including a central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs 26, and other program modules, which will be described in greater detail below with respect to FIG. 3.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a TCP/IP network 4, such as the Internet. The computer 2 may connect to the network 4 through a network interface unit 16 connected to the bus 10. It should be appreciated that the network interface unit 16 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

It should be appreciated that the server computer 6 may include many or all of the conventional computing components shown in FIG. 2. The server computer 6 may also include additional hardware and software components necessary or desirable for the operation of a server computer. For instance, the server computer may include an operating system and other programs utilizing in the operation of a server computer, such as a web server program, an e-mail server program, and other types of programs. The server computer 6 may also include other hardware devices to improve the performance of the server computer 6, such as additional memory, redundant mass storage devices, and other types of server hardware known to those skilled in the art.

Figure 3:
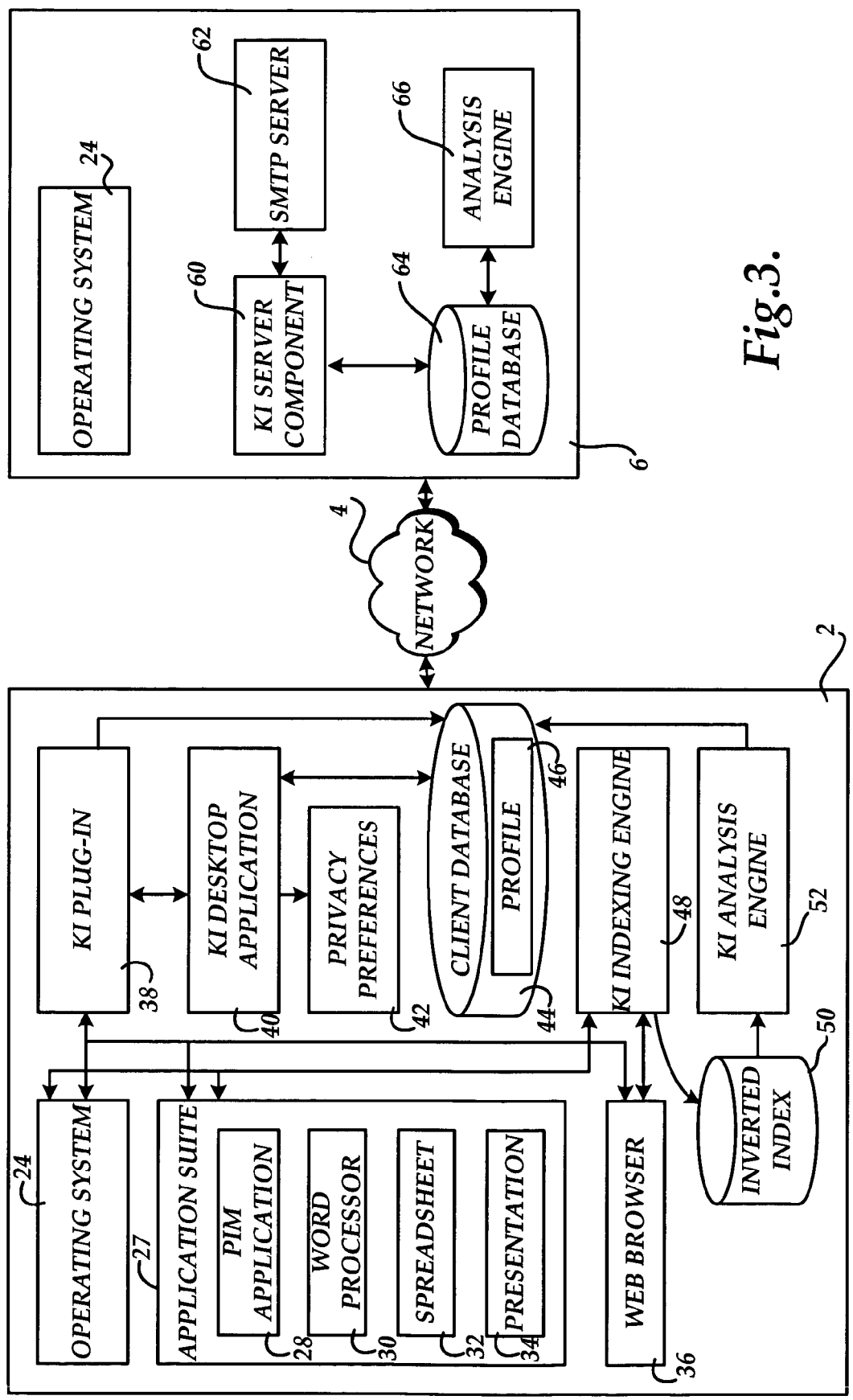
FIG. 3 is a computer software architecture diagram illustrating aspects of several software components utilized in the various embodiments of the invention.

Turning now to FIG. 3, additional details regarding the various software components utilized by the client computer 2 and the server computer 6 will be described. As mentioned briefly above, a number of program modules and data files may be stored in the mass storage device 14 and RAM 18 of the client computer 2, including an operating system 24 suitable for controlling the operation of a networked personal computer, such as the WINDOWS XP operating system from MICROSOFT CORPORATION of Redmond, Wash.

The mass storage device 14 and RAM 18 of the client computer 2 may also store one or more program modules. In particular, the mass storage device 14 and the RAM 18 may store an application suite 27 that comprises one or more application programs. For instance, the application suite 27 may include a personal information manager ("PIM") application program 28 for sending and receiving e-mail messages, for organizing meetings, contacts, and tasks, and for performing other functions. According to one embodiment of the invention, the PIM application program 28 comprises the OUTLOOK PIM program from MICROSOFT CORPORATION of Redmond, Wash., but other PIM programs from other manufacturers may be utilized.

The application suite 27 may also include a word processor application 30 for creating, editing, and viewing electronic documents. According to one embodiment of the invention, the word processor application program 30 comprises the WORD word processing application program from MICROSOFT CORPORATION of Redmond, Wash., but other word processing programs from other manufacturers may be utilized. The application suite 27 may also include a presentation application 34 for creating, editing, and viewing electronic presentations. According to one embodiment of the invention, the presentation application program 34 comprises the POWERPOINT presentation application program from MICROSOFT CORPORATION of Redmond, Wash., but other presentation programs from other manufacturers may be utilized.

The application suite 27 may also include a spreadsheet application 32 for creating, editing, and viewing electronic spreadsheets. According to one embodiment of the invention, the spreadsheet application program 32 comprises the EXCEL spreadsheet application program from MICROSOFT CORPORATION of Redmond, Wash., but other spreadsheet programs from other manufacturers may be utilized.

It should be appreciated that the client computer 2 may execute other types of programs in addition to the application suite 27. For instance, the client computer 2 may execute an instant messaging client application program for instant messaging with other computer. The client computer 2 may also execute a web browser application program 36 for viewing and interacting with web pages. According to one embodiment of the invention, the web browser program 36 comprises the INTERNET EXPLORER application program from MICROSOFT CORPORATION. It should be appreciated, however, that other web browser programs from other manufacturers may be utilized.

As shown in FIG. 3, a number of software components relating to the KI system are also stored and executed on the client computer 2. In particular, a KI plug-in 38 is executed that interfaces with the operating system 24 and the application programs 27 and 36 executing on the client computer. The KI plug-in 38 monitors the user interaction with the operating system and application programs to identify items of interest that may describe the user's interests or contacts. For instance, the KI plug-in 38 may identify the documents created or read by a user, the e-mail messages sent and received by the user, the instant messages sent and received by the user, the web pages visited by the user, the cut-and-paste operations performed by a user, the names of files and folders created by the user, and virtually any other interaction between the user and the operating system or application programs executing on the client computer 2. The KI plug-in may also identify the dwell time on particular documents and web pages to determine the strength of the user's interest in the particular document or web page. The KI plug-in stores the items of interest identified during monitoring in a client database 44.

The KI indexing engine 48 also interfaces with the operating system 24 and the application programs 27 and 36 executing on the client computer. The KI indexing engine 48 also monitors the user interaction with the operating system and application programs to identify items of interest that may describe the user's interests or contacts. The KI indexing engine 48 also performs processing on the items of interest to create an inverted index 50. The inverted index 50 contains data that describes the frequency that words appear among all of the collected items of interest. The inverted index 50 also maintains the location of each word within each item of interest. Therefore, the inverted index 50 may be searched with a word to identify the number of times it occurs in the items of interest and to determine where the word appears in the items of interest.

A KI analysis engine 52 is also periodically executed on the client computer 2. The KI analysis engine 52 utilizes the contents of the KI client database 44 and the inverted index 50 and performs processing to create a KI profile 46 for a user of the client computer 2. The KI profile 46 identifies the interests of the user, the individuals with which the user has communicated, and the topics on which the communication with the individuals was made. More specifically, the KI profile 46 includes one or more keywords and noun phrases that identify the interests of a user of the client computer. The KI profile 46 also includes the identities of one or more individuals with which a user of the client computer has communicated. For each contact, a set of keywords is provided that describes the topics on which communication with the contacts was made. The keywords, noun phrases, and contacts also include weight values that described their importance, or strength. Additional details regarding the various operations performed by the KI analysis engine 52 in creating the KI profile 46 will be provided below.

According to embodiments of the invention, a KI desktop application 40 is provided for controlling the various aspects of the operation of the KI client programs. For instance, through the KI desktop application 40 a user may provide a number of privacy preferences 42 that describe what data may be collected at the client computer, how the data may be utilized, and other preferences regarding anonymity. Additional details regarding the privacy preferences 42 that may be specified by a user and their use will be provided below. The KI desktop application 40 also provides an interface for querying the client computer 2 and the server computer 6 for information and people. Additional details regarding the search process will also be provided below.

According to embodiments of the invention, the KI desktop application 40 is operative to periodically transmit over the network 4 the KI profile 46 for a user to a KI server component 60 executing on the server computer 6. Updates to the KI profile 46 are typically transmitted when significant changes occur to the profile. The privacy preferences 42 for the user are also transmitted to the server computer 6. When the KI profile 46 is received at the server computer 6, the profile is stored in the profile database 64. Profiles from all of the client computers participating in the KI system are aggregated in the profile database 64. Additional processing may be performed on the corpus of KI profiles, for instance, to eliminate noise words across the entire body of keywords. This processing may be performed by the analysis engine 66.

The KI server component 60 is also operative to receive and respond to query requests from the KI desktop application 40. In response to such requests, the KI server component 60 queries the profile database 60 for the desired information and returns the search results to the requesting client computer. As will be described in greater detail below, some participants in the KI system may desire to remain anonymous until such time as they desire to aid another participant. In such cases, it may be necessary for the server computer 6 to provide a brokered communication process between a seeker and an anonymous connector. An SMTP server 62 is utilized to send and receive e-mail messages during the brokered communication process. Additional details regarding the processes performed by the server computer 6 when receiving and responding to search queries and for performing the brokered communication process will be described below.

Figure 4:
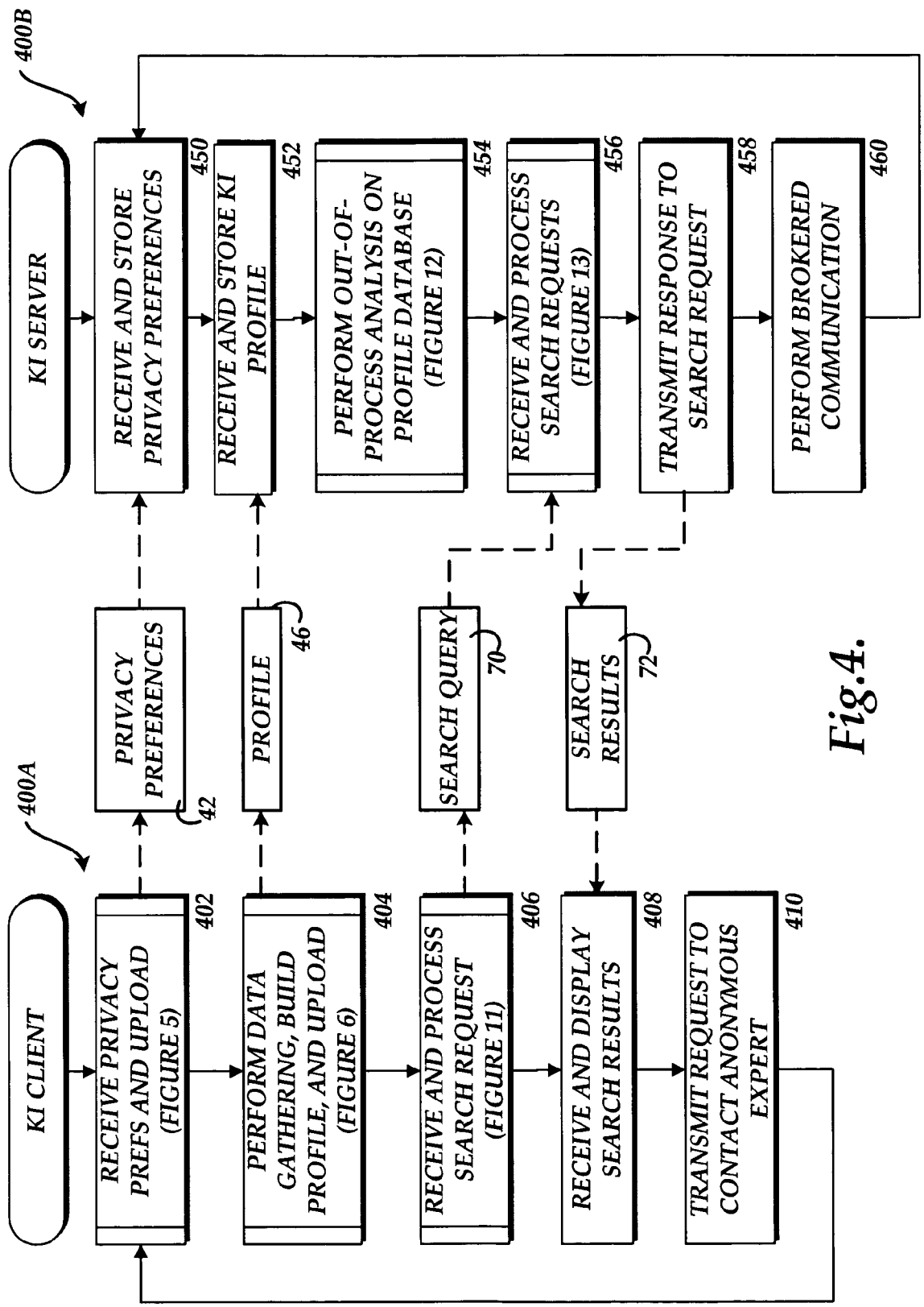
FIG. 4 is a flow diagram illustrating aspects of the operation of a client computer and a server computer according to one embodiment of the invention.

Referring now to FIG. 4, several routines 400A and 400B will be described illustrating processes performed by the client computer 2 and the server computer 6, respectively, for providing a KI system. When reading the discussion of the routines presented herein, it should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in the state diagrams discussed herein, and making up the embodiments of the present invention described herein, are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400A illustrates the various operations performed by client computers 2A-2C participating in the KI system. The routine 400B illustrates the various operations performed by the server computer 6. The routine 400A begins at operation 402, where privacy preferences 42 are received from a user by the KI desktop application 40. The privacy preferences 42 specify the type of data that may be collected by the KI system, how the data may be utilized, and other types of privacy-related preferences. The privacy preferences 42 are transmitted from the client computer 2 to the server computer 6. At operation 450 of the routine 400B, the server computer 6 receives and stores the privacy preferences 42. Additional details regarding the types of privacy preferences that may be specified by a user and their use are provided below with respect to FIG. 5.

From operation 402, the routine 400 continues to operation 404, where the KI client programs perform data gathering, build the KI profile 46, and upload the KI profile 46 to the server computer 6. The server computer 6 receives and stores the KI profile 46 at operation 452 of the routine 400B. Additional details regarding the gathering of data and creation of the KI profile 46 will be provided below with respect to FIG. 6. From operation 452, the routine 400B continues to operation 454, where the server computer 6 performs out-of-process processing on the profile database. For instance, the server computer 6 may remove noise words from the profile database. Additional details regarding this process are provided below with respect to FIG. 12.

From operation 404, the routine 400A continues to operation 406, where a search query 70 is received from a user at the KI desktop application 40. The search query 70 may first be performed on the client computer 2 to locate any relevant information that is stored locally. The query 70 may then be transmitted to the server computer 6, where it is received and processed by the server computer 6 at operation 456 of the routine 400B. Additional details regarding receiving and processing a search request at the client computer will be provided below with respect to FIG. 11. Additional details regarding receiving and processing search requests at the server computer 6 will be described in greater detail below with respect to FIG. 13.

At operation 458, the server computer 6 transmits the search results 72 to the client computer 2. The client computer 2 then displays the search results at operation 408. The search results may identify information, such as documents, web pages, etc., that are of interest to the user. The search results may also identify contacts that may have information helpful to the user. According to one embodiment of the invention, a contact identified as helpful may have specified that they would like to remain anonymous with respect to certain keywords or contacts. If such a contact is identified within the search results 72, the contact will be identified anonymously in the search results. The user of the client computer 2 may then make a request to connect with the anonymous contact at operation 410. If such a request is received, the server computer 6 performs a brokered communication process with the anonymous contact at operation 460.

According to the brokered communication process, the KI server 6 will transmit to the anonymous contact a request for assistance on behalf of the user submitting the search query. The request may or may not specifically identify the user submitting the search query. The expert may then reply to the request with an indication as to whether or not they will provide assistance to the user submitting the search query. If the expert will offer assistance, the identity of the expert is transmitted to the user making the search query. Otherwise, an indication is transmitted to the user making the search query that assistance will no be provided. The user making the search query may then choose to contact another individual from the provided search results. Additional details regarding the brokered communication process will be provided below.

From operation 410, the routine 400A branches back to operation 402, where data collection continues, where privacy preferences may be modified, and where search requests may again be processed and received. From operation 460, the routine 400B continues back to operation 450, where privacy preferences and updated KI profiles are received and stored, where search queries are received and processed, and where brokered communications may be performed. Additional details regarding each of these individual processes are described in greater detail below with respect to FIGS. 5-13.

Figure 5:
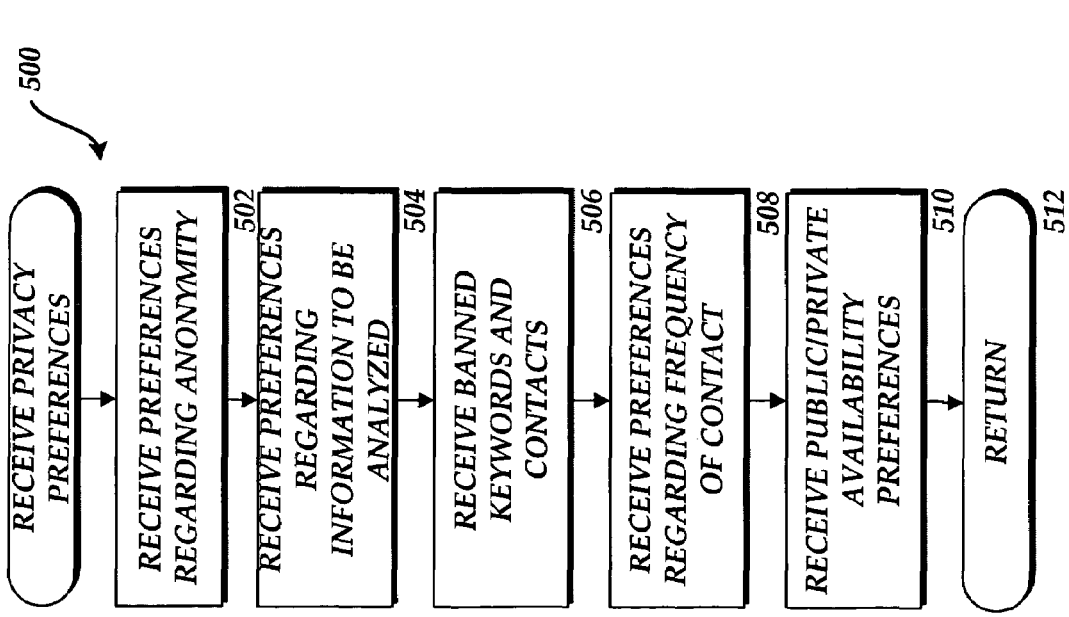

Referring now to FIG. 5, additional details will be described regarding receiving and utilizing privacy preferences from a participant in the KI system. As described above, the KI desktop application 40 creates a list of keywords and noun phrases that estimate a participating user's interest areas and their strength of interest. The KI desktop application 40 also creates a list of business/social contacts that estimate the user's social network and the associated strength of the relationships. This information is sent to the KI server 6 in the form of the KI profile 46. The server computer 6 utilizes this information to match seekers with connectors who are likely to help. The process of connecting the seeker with a connector is workable if and only if the connector is comfortable with the process and continues to be a part of the process. In order to create a level of comfort on the part of each participant in the KI system that collected information will be maintained in a private manner, the KI system provides a number of controls to the connector so that the connector may set privacy preferences relating to the collection and use of their personal information. These features are illustrated in FIG. 5.

The routine 500 begins at operation 502, where preferences are received from the user of the client computer 2 regarding anonymity. In this regard, the participant can choose to remain anonymous until he or she decides to help without the seeker knowing their identity. The KI server 6 performs a mediated communication process to provide a connection between the seeker and the target without letting the seeker know the target's identity. The target can choose to reject the request. In, that case, the seeker may move on to the next plausible connector. This process works both when the connector connects the seeker with knowledge, such as a document, or other people.

From operation 502, the routine 500 continues to operation 504, where preferences may be received from the participant regarding the information to be collected at the client computer 2. In this regard, the participant may choose to exclude any type of item or category of item from the collection process performed at the client computer 2. For instance, the user may indicate that confidential or attorney/client privileged e-mails be excluded from collection. Similarly, the participant may indicate that e-mails from a particular e-mail address or domain, such as e-mails likely to be received from personal contacts, be excluded from the collection. Similarly, the user may exclude instant messages from particular instant messaging contacts from collection. In this manner, the user can specifically set boundaries on the types of information that may be monitored at the client computer 2.

From operation 504, the routine 500 continues to operation 506 where the user may specify one or more banned keywords and contacts. By banning keywords and contacts, the user of the computer 2 can ensure that the keywords or contacts are not transmitted to the server computer 6 and stored within the profile data. From operation 506, the routine 500 continues to operation 508, where preferences are received from the user regarding frequency of contact. In this manner, the user can choose to be contacted only a certain number of times per week, or other period of time. Through the use of this privacy setting, the server computer 6 will only contact a user the specified number of times during the specified period. From operation 508, the routine 500 continues to operation 510.

At operation 510, the user is permitted to specify privacy preferences regarding public and private keywords and contacts. Public keywords and contacts are those contacts that should be published for all users. Alternatively, specific keywords or contacts may be published only for friends of the participant, or for friends of friends of the participant. Alternatively, the participant may identify keywords or contacts as private words which, when utilized to identify the participant, will result in the participant's name being treated as anonymous. In order to connect with a participant through a keyword or contact that has been identified as private, communication must be performed through the KI server 6 anonymously. The brokered communication process described herein provides the means for communicating with an anonymous participant. Additional details regarding the brokered communication process are provided below. From operation 510, the routine 500 continues to operation 512, where it returns to operation 404, described above with respect to FIG. 4.

Figure 6:
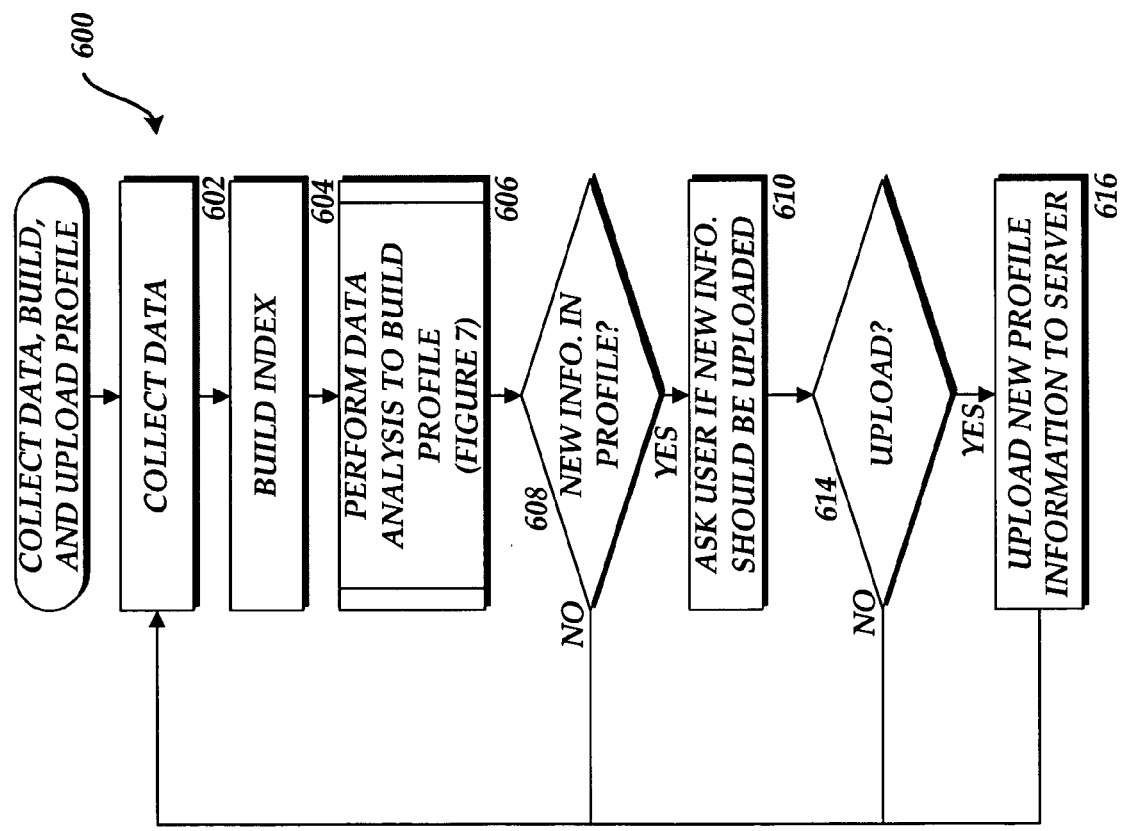

Referring now to FIG. 6, an illustrative routine 600 will be described for collecting data at the client computer 2, building the KI profile 46, and uploading the profile to the server computer 6. The routine 600 begins at operation 602, where data is collected at the client computer 2. As described above, data is collected by monitoring user interaction with programs executing at the client computer to identify items of interest to the user. As described above, items of interest may comprise word processing documents, spreadsheet documents, presentation documents, e-mail messages, instant messages, web sites, and other types of information described herein. As also described briefly above, the KI analysis engine 52 indexes all of the items of interest to create an index 50. The index 50 consists of the content and the metadata associated with the items of interest such as the people listed within an e-mail on the To:, From:, CC:, and other fields. This data forms the basis of analysis of the expertise and the social network. According to embodiments of the invention, the KI client software may also obtain publicly available information from lightweight directory assistance protocol ("LDAP") servers about the user such as the user's name, title, manager, and other publicly available information. Utilizing this data, the KI analysis engine 52 creates the index 50 at operation 604.

From operation 604, the routine 600 continues to operation 606, where an analysis is performed on the contents of the index to build the KI profile 46. As will be described in greater detail below with respect to FIG. 7, social analysis, an interest analysis, and a noun phrase analysis are performed on the content in the index to create the KI profile 46 that is transmitted to the server computer 6. Additional details regarding this process will be described below with respect to FIG. 7.

From operation 606, the routine 600 continues to operation 608, where a determination is made as to whether new information exists within the KI profile 46 since the last transmission of the profile to the server computer 6. If no new information exists within the profile, the routine 600 returns to 602 where the data collection and analysis process continues. If, however, new information exists within the KI profile 46, the routine 600 continues to operation 610 where the user may be asked whether the new information should be uploaded to the server computer 6. The routine 600 then continues to operation 614.

At operation 614, a determination is made as to whether the user has authorized the upload of the new information for the KI profile 46 to the server computer 6. If the user has not authorized the transmission of the new information, the routine 600 returns to operation 602, where the data collection and analysis process continues. If the user has authorized the transmission of the new data in the KI profile 46, the routine 600 continues to operation 616 where the new information is uploaded to the server computer 6 and stored in the profile database 64. From operation 616, the routine 600 returns to operation 602 where the data collection and analysis processes continue.

Figure 7:
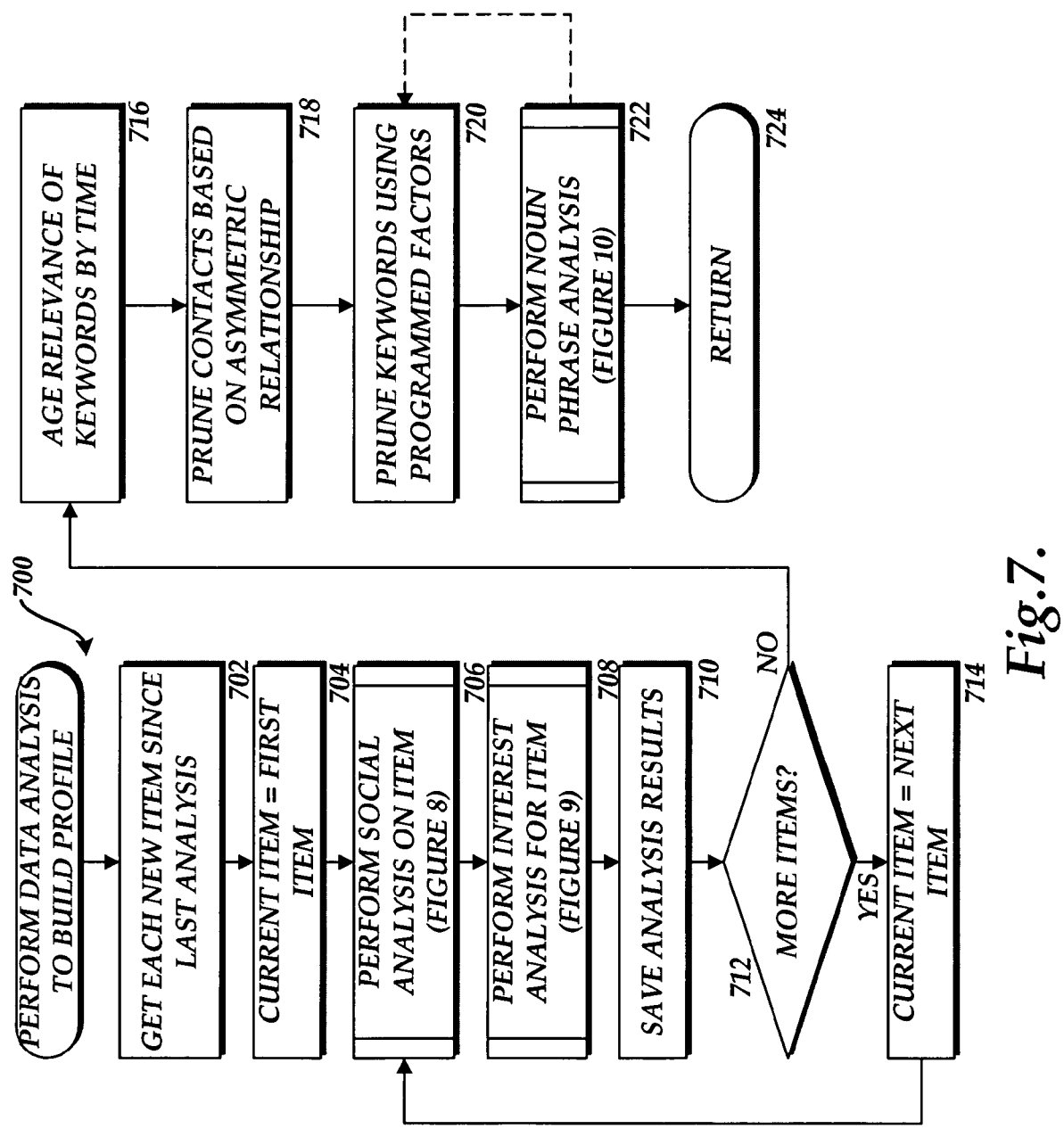

Turning now to FIG. 7, additional details will be provided regarding a process of performing a data analysis at the client computer 2 to build the KI profile 46. The routine 700 begins at 702, where each new item of interest is identified that was generated since the KI profile 46 was last built. The routine 700 then continues to operation 704, where a temporary variable pointing to a current item is set to the first item of interest among the identified items. In this manner, each item of interest may be processed individually in the manner described below.

From operation 704, the routine 700 continues to operation 706, where a social analysis is performed on the current item. The social network analysis identifies a pattern of communication between the user and others via electronic mail messages, calendar meetings, and instant messages. As will be described in greater detail below with respect to FIG. 8, the analysis examines each electronic mail message, meeting request, and instant message, and identifies the contacts listed in the various header fields. All electronic mail messages and meetings from all folders are considered. Additional details regarding this process will be provided below with respect to FIG. 8.

From operation 706, the routine 700 continues to operation 708, where an interest analysis is performed for the current item. The interest analysis examines the contents of each item of interest and its subject. Additional details regarding the interest analysis are provided below with respect to FIG. 9.

From operation 708, the routine continues to operation 710, where the results of the social analysis and the interest analysis are saved. The routine 700 then continues to operation 712, where a determination is made as to whether additional items of interest remain to be processed. If additional items of interest remain to be processed, the routine 700 continues to operation 714, where the temporary variable pointing to the current item is incremented to the next item of interest to be processed. The routine 700 then returns to operation 706, where the social analysis and interest analysis are performed on the current item.

If, at operation 712, it is determined that no additional new items of interest remain to be processed, the routine 700 branches from operation 712, to operation 716. At operation 716, keywords identified by the interest analysis are aged based upon a time decay. This analysis takes into account the idea that the words occurring in the past are less relevant at the current time than other words that have occurred more recently. The routine then continues to operation 718, where contacts identified by the social network analysis are eliminated based on the existence of an asymmetric relationship. This may occur, for instance, with electronic mail messages that did not include round-trip communication between a sender and a receiver. This would, for example, remove senders of spam messages and distribution list senders. In a similar vein, keywords that were contained only in items of interest having an asymmetric relationship may also be removed.

From operation 718, the routine 700 continues to operation 720, where the keywords identified through the interest analysis may also be pruned using one more programmed factors. Programmed factors may be included with the KI client software and additional program factors may be added later by a custom software developer. According to embodiments of the invention, the programmed factors may include a consistency factor that judges the relevance of keywords over an extended period of time. In order to apply the consistency factor, the relevance of keywords in each electronic mail message may be summed to form the expertise of the user over time. This reflects the idea that if a particular keyword appears to be relevant to a person for an extended period of time, then the keyword is in an area of higher interest.

Another programmed factor that may be utilized is a diffusion index. The diffusion index is defined as the number of people a person communicates with about a particular topic. The diffusion index reflects the idea that if a person talks about a topic with numerous people, then the user is more likely to be a connector within the KI system. This becomes relevant in the processing of the server computer 6 when finding a likely helper in response to a search query.

Another programmed factor that may be utilized at operation 702, is a folder factor. A folder factor flags all words appearing in folder names that are non-standard as potential keywords for the KI system. When the same words appear within documents and electronic mail messages, the relevance of these words may be increased. The folder factor reflects the idea that users are likely to utilize keywords of interest when creating file folders on the computer 2.

Another programmed factor that may be utilized treats distribution lists as individuals. As known to those skilled in the art, distribution lists comprise mailing lists in which two or more individuals may be mailed with information simultaneously. By treating distribution lists as individuals, a similar analysis is carried out as described herein on all of the e-mails where the distribution list appears. This allows keywords to be identified that capture the interest shared by the individuals named on the distribution list. It should be appreciated that other programmed factors may also be utilized at operation 720.

From operation 720, the routine 700 continues to operation 722, where a noun phrase analysis is performed on the list of keywords that have been identified as associated with the user. The noun phrase analysis attempt to identify noun phrases that captures the user's interest. The idea is to capture a higher level concept than just keywords. Additional details regarding the process for performing the noun phrase analysis will be described below with respect to FIG. 10. From operation 722, the routine 700 continues to operation 724, where it returns to operation 608 described above with respect to FIG. 6.

Figure 8:
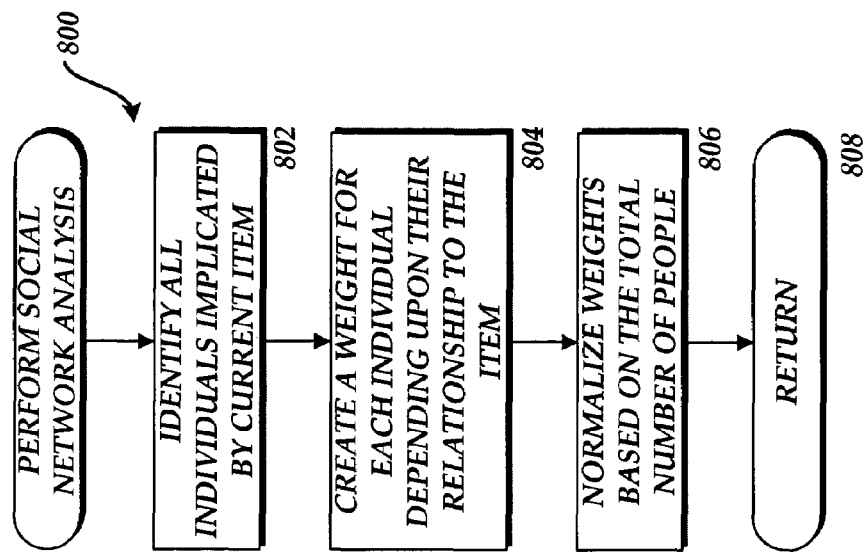
FIGS. 5-11 are flow diagrams illustrating additional aspects of the operation of a client computer according to the various embodiments of the invention.

Turning now to FIG. 8, additional details will be provided regarding the social network analysis performed by the embodiments of the present invention. The routine 800 begins at operation 802, where all of the individuals related to an item of interest are identified. For instance, each of the individuals listed in the header fields of an electronic mail message, such as the From, To, CC; and BCC fields, is identified. Alternatively, with respect to meeting requests, each of the individuals listed as participating in the meeting are identified. Once each individual related to the item of interest has been identified, the routine 800 continues from operation 802 to operation 804.

At operation 804, a weight is assigned to each individual related to the item depending on the individual's relationship with the item. For instance, different weights may be provided to users that are listed in different fields of an electronic mail message. For instance, a user listed in the From field may be given a higher weight than a user listed in the To field. A user listed in the cc field may be given a higher weight than a user listed in the BCC field, and so on. This takes into account that there is a business or social relationship between people listed within an electronic mail message and accounts for the fact that the strength may be proportional to where the person appears in the various fields of the electronic mail message. A weight is assigned and each person appearing on the list gets a weight associated with the social or business relationship between the user and the identified person.

From operation 804, the routine 800 continues to operation 806, where the weights assigned to each individual related to the item are normalized to the total weight of all the weights assigned for the item. This takes into account the fact that as the number of people listed on an electronic mail message increases, the relevance of the message to the closeness of the participants may go down. The more people that are listed on an e-mail message, the less weight they can contribute to the social network as a result of the particular item.

According to embodiments of the invention, the weight associated with a particular item may also be decreased with time. This takes into account the idea that electronic mail messages from the distant past are less of an indication of closeness between people than more recent e-mails. As a result of the social network analysis described above, the KI profile estimates the strength of the relationship between the user and each of the user's contacts. Once this process has completed, the routine 800 continues from operation 806 to operation 808, where it returns to operation 708, described above with respect to FIG. 7.

Figure 9:
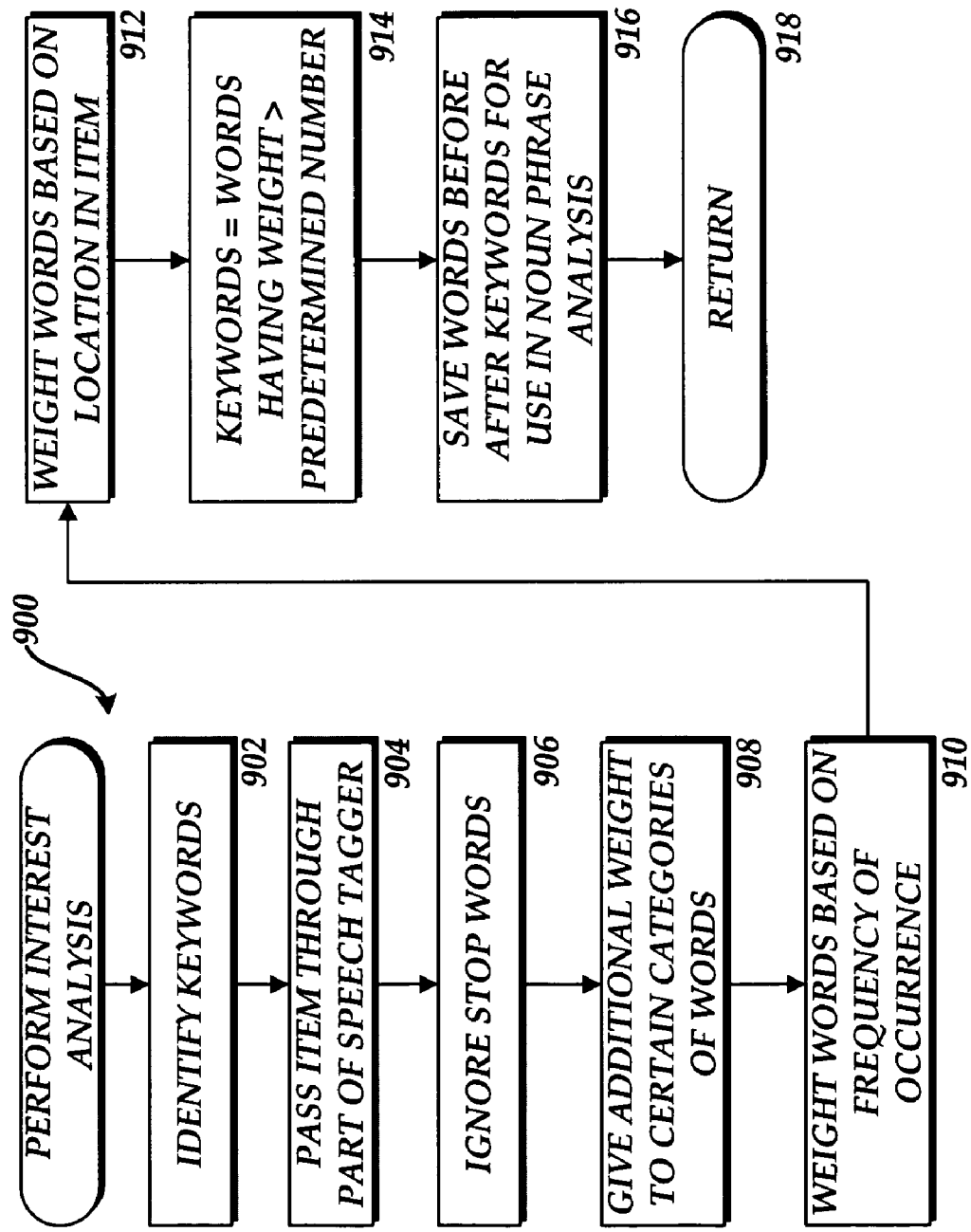

Turning now to FIG. 9, additional details will be described regarding the interest analysis performed by the client computer 2 in order to create the KI profile 46. The interest analysis examines the contents of each item of interest. The analysis enumerates each item of interest and examines the content and subject. The result of the interest analysis is a list of keywords and weights for each keyword corresponding the level of interest for the user.

The routine 900 begins at operation 902, where keywords within the current item of interest are identified. At operation 904, a software program for tagging parts of speech within a run of text may be utilized to identify the various parts of speech within the current item. The routine 900 then continues to operation 906, where various types of words may be removed from the current item. For instance, equivalent words like "add" and "added" may be removed, and other words that are extremely common may be ignored.

From operation 906, the routine 900 continues to operation 908, where additional weight may be allocated to certain keywords based on their location with respect to the item of interest. For instance, additional weight may be assigned to words in the subject line, heading, title, or folder name of the current item.

From operation 908, the routine 900 continues to operation 910, where the weight of each keyword is assigned based on the frequency of occurrence of the word. This takes into account the idea that words that occur infrequently within the item of interest should be considered important. This also takes into account the idea that words that occur too often may have less weight per occurrence. In order to perform this process, the weight of a word occurring in the item of interest is normalized across the corpus of the words occurring in the user's indexed data.

From operation 901, the routine 900 continues to operation 912, where the weight of each word is based on its location within the current item. A word that occurs within a subject line of an e-mail message, for instance, does not decay with its position in the subject or in the body. A word, however, that occurs exclusively in the body of an electronic mail message decays with its position in the body. The further away from the beginning of the body a word occurs, the more the word decays. This takes into account the idea that people put more important words and ideas in the title and early portion of an e-mail message. From operation 912, the routine 900 continues to operation 914.

At operation 914, keywords within the current item are identified as those words having a weight greater than a predetermined number. In order to perform this function, the weights of all of the words in the current item are added up. Only words that have a weight above a predetermined number are chosen as keywords for the current item. Generally, this reflects the idea that there are only a few keywords per item of interest.

From operation 914, the routine 900 continues to operation 916, where the words occurring just prior to and just after the identified keywords are saved for use in the noun phrase analysis. Additional details regarding the noun phrase analysis are described below with reference to FIG. 10. From operation 916, the routine 900 continues to operation 918, where it returns to operation 710, described above with respect to FIG. 7.

Figures 10, 11, 12:
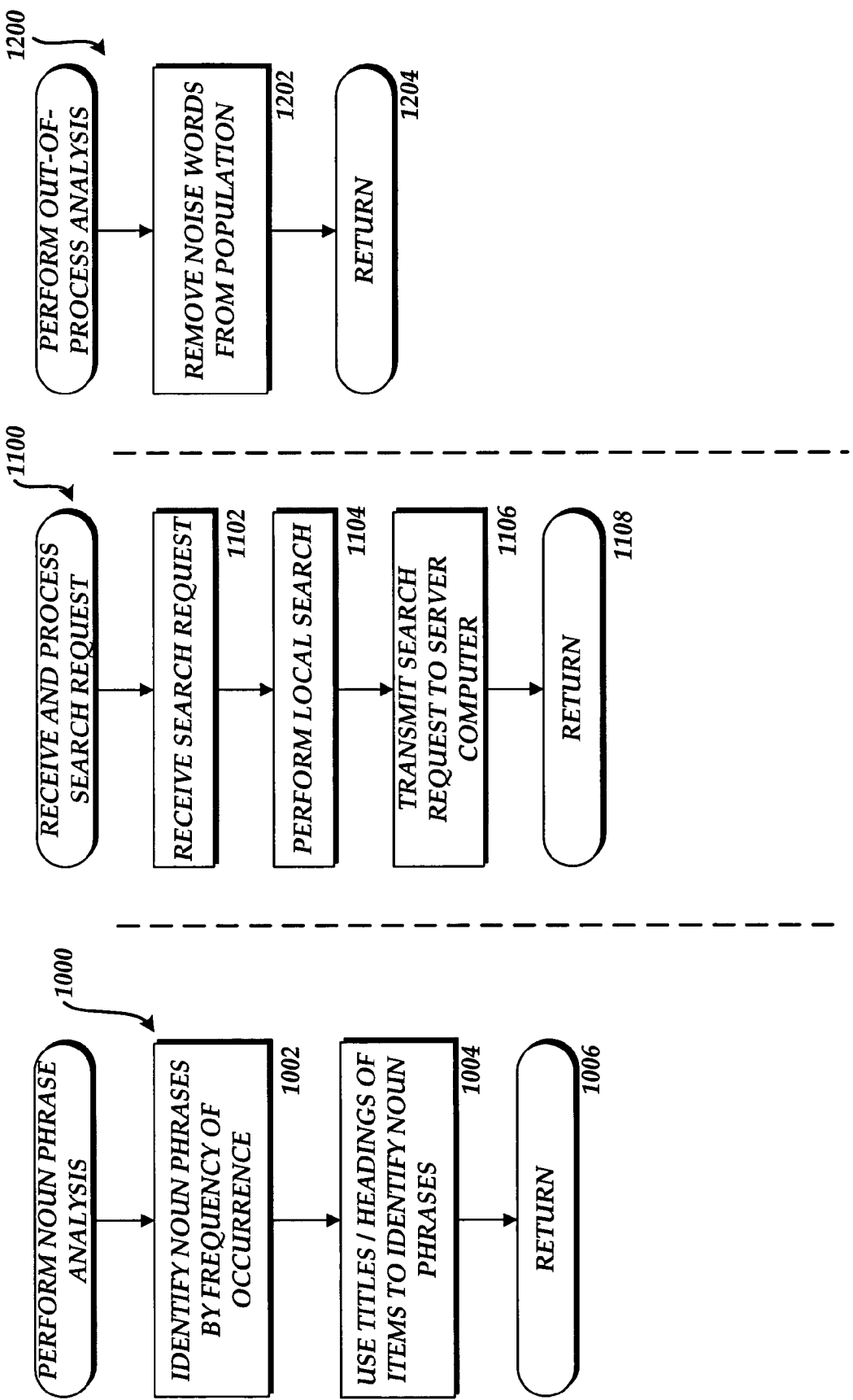
FIGS. 12-13 are flow diagrams illustrating additional aspects of the operation of a client computer according to the various embodiments of the invention.

Referring now to FIG. 10, additional details will be described regarding the noun phrase analysis processing performed by the client computer 2 when creating the KI profile 46. The noun phrase analysis is performed once a list of keywords associated with the user has been estimated. A noun phrase analysis attempts to find noun phrases of length two or three that capture the user's interest. This allows the noun phrase analysis to capture a higher level concept than just individual keywords.

The routine 1000 begins at operation 1002, where noun phrases are identified by their frequency of occurrence. In order to perform this process, each item of interest is analyzed and the keywords previously identified are examined. Words occurring before and after each keyword are identified and analyzed to find runs of words occurring next to each other. The runs of words are then reordered based on the total relevance of the words occurring in the phrase. A test is also performed as to whether the words appear in the titles or headings of documents that have been indexed. If so, the noun phrases are associated with the user in the KI profile 46. This takes into account that words and relevant noun phrases occur in that form many times in a row in e-mail and other conversations. These same words are also likely to occur in titles of documents and also in hearings of various documents.

From operation 1002, the routine 1000 continues to operation 1004, where headings and titles of items of interest are utilized to identify noun phrases. In order to perform this process the documents authored or read by the user are examined and the titles and headings are extracted from the documents. These noun phrases contained within the titles and headings are then added to the noun phrases list contained within the KI profile 46. From operation 1004, the routine 1000 continues to operation 1006, there it returns to operation 724, described above with respect to FIG. 7.

Referring now to FIG. 11, an illustrative routine 1100 will be described for receiving and processing a search request at the client computer 2. As described briefly above, the KI desktop application 40 may receive search queries of the user client computer 2. This occurs at operation 1102. In response to receipt of a search request, the routine 1100 continues to operation 1104 where a local search of the data contained on the client computer 2 is performed for the requested query. This allows any data relevant to the requested search query that is local to the client computer 2 to be identified for the user.

The routine 1100 continues from operation 1104 to operation 1106, where the query request is transmitted to the KI server component 60 executing on the server computer 6. As will be described in greater detail below with respect to FIGS. 12 and 13, the search query is processed by the client computer 2 to identify information or individuals from within the profile database 64 that satisfy the search query. The results are then returned from the server computer 6 to the client computer 2 where they are displayed to the user. From operation 1106, the routine 1100 continues to operation 1108, where it returns to operation 408, discussed above with reference to FIG. 4.

Referring now to FIG. 12, an illustrative routine 1200 will be described for performing an out-of-process analysis at the server computer 6 on the contents of the profile database. The out-of-process analysis refers to the fact that the analysis occurs out of the context of a search query. This processing is performed by the server computer 6 in the ordinary course of its analysis.

The routine 1200 begins at operation 1202, where noise words within the corpus of the profile database 64 are eliminated. Noise words are words that are very common among users in a large disjointed population. It should be appreciated that other types of out-of-process analysis may be performed by the server computer 6. From operation 1202, the routine continues to operation 1204, where it returns to operation 456, described above with respect to FIG. 4.

Figure 13:
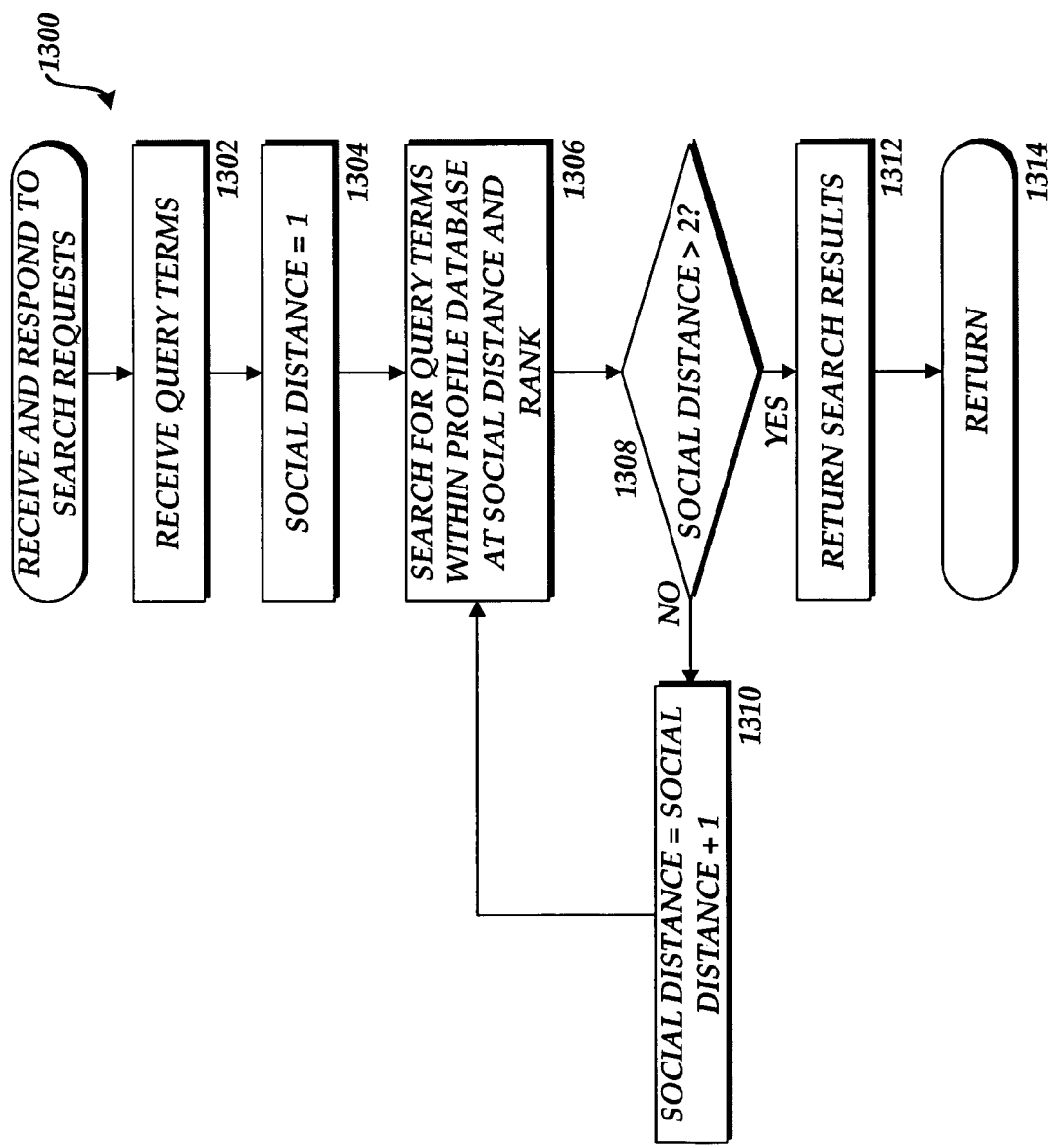

Referring now to FIG. 13, an illustrative routine 1300 will be described illustrating the processes performed by the server computer 6 for receiving and responding to search queries. It should be appreciated that, according to one aspect of the invention, the request to query the profile database 64 may take the form of a request to locate an individual that can assist with a particular topic. In this case, the profile database 64 may be searched to identify individuals that are experts in the particular topic and that are within a predefined social distance from the user making the search query. Social distance indicates the number of individuals needed to connect any two individuals among a group of connected individuals.

According to another aspect of the invention, the request to query the profile database 64 may take the form of a request to locate an individual that can make a connection to another individual within the profile database. In order to execute this type of query, the profile database 64 may be searched to identify individuals that are within a predefined social distance from the user making the search query and that also have the individual listed as a contact within their KI profile.

In another scenario, the request to query the profile database may take the form of a request to locate an individual that can make a connection to another individual that is located outside an enterprise and therefore not directly identified within the profile database 64. In order to perform this type of query, the profile database may be searched to identify individuals that have the queried individual listed as a contact within their KI profile. Alternatively, individuals may be identified based upon keywords that have been projected upon them. This occurs, for instance, when a user is not a participant within the KI system and is a contact of others that are participants within the KI system. According to this aspect of the invention, the KI system builds a profile for the user even though the user is not a participant based on keywords projected onto the user by others. The individuals that are not participants in the KI system can them be identified and located just as any other participants within the KI system.

According to yet another aspect of the invention, the search query may be performed to locate individuals with interest common to the searcher and to determine the materials that the individuals have been reading or otherwise utilizing. In this case, the search request takes the form of a request to query the profile database to locate information consumed by other individuals having similar interests. In order to perform this query, the profile database is searched to identify individuals having similar interests as the user making the request. Thereafter, the profile database is searched to identify information consumed by the individuals having similar interests from the contents of their KI profiles. FIG. 13 illustrates an abstract method for performing each of these types of queries.

The routine 1300 begins at operation 1302, where the query terms are received at the server computer 6 from the client computer 2. The routine 1300 then continues to operation 1304, where variables corresponding to the current social distance is set equivalent to one. The routine then continues to operation 1306, where a search is performed over the profile database 64 for query terms within the current social distance. Once keywords have been identified within the profile database 64 that correspond to the query terms these keywords are ranked by order of relevance.

From operation 1306, the routine 1300 continues to operation 1308, where a determination is made as to whether the social distance is greater than a predetermined number. In one embodiment, this number is equivalent to two. If the current social distance is not greater than the predetermined number, the routine 1300 branches to operation 1310 where the current social distance is incremented. The routine then branches back from operation 1310 to operation 1306 where an additional search is performed at the current social distance.

If, at operation 1308, it is determined that the current social distance is greater than the predefined number, the routine 1300 continues to operation 1312, where the search results are returned to the user of the client computer 2. The routine 1300 then continues to operation 1314, where it returns to operation 458, described above with respect to FIG. 4. As described briefly above, if a private keyword is identified during a search query as being associated with a contact, the user's identity is not made publicly available with the search results. Rather, the KI server computer 6 performs a brokered communication process between the user submitting the search query that identified the user and the target. According to the brokered communication process, the search results identify the expert only anonymously.

In order to contact the anonymous expert, the searching user may submit a request to the KI server computer to contact the expert. Based on the request, the KI server will transmit to the expert a request for assistance on behalf of the user submitting the search query. The request may or may not specifically identify the user submitting the search query.

The expert may then reply to the request with an indication as to whether or not they will provide assistance to the user submitting the search query. If the expert will offer assistance, the identity of the expert is transmitted to the user making the search query. Otherwise, an indication is transmitted to the user making the search query that assistance will not be provided. The user making the search query may then choose to contact another individual from the provided search results.

Based on the foregoing, it should be appreciated that the various embodiments of the invention include a method, system, apparatus, and computer-readable medium for creating a KI profile. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for responding to knowledge interchange queries, the method comprising:
    receiving and storing preferences for knowledge interchange profiles associated with a plurality of individuals from a plurality of client computers, the preferences being operative to indicate: an anonymity of a corresponding individual associated with information stored in a corresponding knowledge interchange profile and an exclusion of data from the corresponding knowledge interchange profile;
    receiving and storing the knowledge interchange profiles in a profile database, wherein each knowledge interchange profile comprises at least one keyword, at least one noun phrase, and at least one contact;
    performing out-of-process processing on the profile database to eliminate noise words from the profile database;
    receiving a request to query the profile database;
    executing the requested query over the profile database to identify search results; and
    returning the search results as a response to the query.

2. The method of claim 1, wherein receiving the request to query the profile database comprises receiving a request to locate at least one individual that assists with a particular topic, and wherein executing the received requested query over the profile database comprises:
    searching the profile database to identify the at least one individual that is an expert are experts in the particular topic and that is within a predefined social distance from a user making the search query.

3. The method of claim 1, wherein receiving the request to query the profile database comprises receiving a request to a first individual that makes a connection to another a second individual within the profile database, and wherein executing the received requested query over the profile database comprises:
    searching the profile database to identify the first individual that is within a predefined social distance from a user making the search query and that has the second individual listed as a contact within the knowledge interchange profile.

4. The method of claim 1, wherein receiving the request to query the profile database comprises receiving a request to locate a first individual that makes a connection to another a second individual that is located outside an enterprise, and wherein executing the received requested query over the profile database comprises:
    searching the profile database to identify the first individual that has the second individual listed as a contact within the individual knowledge interchange profile.

5. The method of claim 1, wherein receiving the request to query the profile database comprises receiving a request by a user to locate information consumed by other individuals at least one individual having similar interests as the user making the request, and wherein executing the received requested query over the profile database comprises:
    searching the profile database to identify the at least one individual having similar interests as the user making the request, and identifying information consumed by the at least one individual having similar interests from the contents of the individual knowledge interchange profiles.

6. The method of claim 1, wherein receiving the request to query the profile database comprises receiving a request by a user to locate an individual that assists with a particular topic, and wherein the individual is located within a predefined social distance from the user making the request.

7. A computer-readable storage medium having computer-executable instructions stored thereon which, when executed by a computer causes the computer to perform a method for responding to knowledge interchange queries, the method comprising:
    receiving and storing preferences for knowledge interchange profiles associated with a plurality of individuals from a plurality of client computers, the preferences being operative to indicate: an anonymity of a corresponding individual associated with information stored in a corresponding knowledge interchange profile and an exclusion of data from the corresponding knowledge interchange profile;
    receiving and storing the knowledge interchange profiles in a profile database, wherein each knowledge interchange profile comprises at least one keyword, at least one noun phrase, and at least one contact;
    performing out-of-process processing on the profile database to eliminate noise words from the profile database;
    receiving a request to query the profile database;
    executing the requested query over the profile database to identify search results; and
    returning the search results as a response to the query.

8. A computer-controlled apparatus having a processor coupled to a computer readable storage medium for responding to knowledge interchange queries, the method comprising:

receiving and storing preferences for knowledge interchange profiles associated with a plurality of individuals from a plurality of client computers, the preferences being operative to indicate: an anonymity of a corresponding individual associated with information stored in a corresponding knowledge interchange profile and an exclusion of data from the corresponding knowledge interchange profile;

receiving and storing the knowledge interchange profiles in a profile database, wherein each knowledge interchange profile comprises at least one keyword, at least one noun phrase, and at least one contact;

performing out-of-process processing on the profile database to eliminate noise words from the profile database;

receiving a request to query the profile database;

executing the requested query over the profile database to identify search results; and returning the search results as a response to the query.

9. A system for processing knowledge interchange queries, the system comprising:

a client computer operative to create a knowledge interchange profile corresponding to a user of the client computer by monitoring user interaction with at least one program executing on the client computer, and wherein the knowledge interchange profile identifies interests of the user, individuals with which the user has communicated, and topics on which communication with the individuals was made based on the user's knowledge interchange profile preferences, the preferences being operative to indicate: an anonymity of the user associated with information stored in the knowledge interchange profile and an exclusion of data from the knowledge interchange profile; and a server computer operative to receive and store knowledge interchange profiles from a plurality of client computers in a profile database, receive a request to query the profile database, execute the requested query over the profile database to identify search results, and return the search results as a response to the query.

10. The system of claim 9, wherein the at least one program comprises at least one of the following: a word processing application program, a spreadsheet application program, a presentation application program, a personal information manager program, an instant messaging application program, a web browser program, and an operating system program.

11. The system of claim 10, wherein monitoring user interaction with the at least one program executing on the client computer identifies at least one item of interest, and wherein creating the knowledge interchange profile comprises, for each item of interest:

performing a social network analysis;

performing an interest analysis; and performing a noun phrase analysis.

12. The system of claim 11, wherein performing the social network analysis comprises:

identifying contacts related to the at least one item of interest;

creating a weight for each contact related to the at least one item of interest, the weight based in part on a relationship of each contact to the at least one item of interest; and normalizing the weights for each contact.

13. The system of claim 11, wherein performing the interest analysis comprises:

identifying at least one keyword within the at least one item of interest;

assigning a weight value to the at least one keyword;

adjusting the weight value of the at least one keyword depending on a location of the at least one keyword within the at least one item of interest;

adjusting the weight value of the at least one keyword depending on a frequency of occurrence of the at least one keyword in the at least one item of interest; and eliminating the at least one keyword when the at least one keyword has the weight value not greater than a predetermined value.

14. The system of claim 13, wherein performing the interest analysis further comprises saving a word before the at least one keyword and after the at least one keyword for use in the noun phrase analysis.

15. The system of claim 11, wherein the noun phrase analysis comprises:

identifying noun phrases by identifying within the at least one item of interest at least one keyword that is repeated in conjunction with at least one other word; and identifying noun phrases based on a location of the at least one keyword utilized in conjunction with the at least one other word within the at least one item of interest.

16. The system of claim 11, further comprising eliminating the individual based on an asymmetric relationship with the user.

17. The system of claim 13, further comprising eliminating the at least one keyword based on programmed factors.

18. The method system of claim 9, wherein receiving the request to query the profile database comprises receiving a request to locate at least one individual that assists with a particular topic, and wherein executing requested query over the profile database comprises: searching the profile database to identify the at least one individual that is an expert are experts in the particular topic and that is within a predefined social distance from a user making the search query.

19. The system of claim 9, wherein receiving the request to query the profile database comprises receiving a request to locate a first individual that makes a connection to another a second individual within the profile database, and wherein executing the received requested query over the profile database comprises: searching the profile database to identify the first individual individuals that is within a predefined social distance from a user making the search query and that has the second individual listed as a contact within the individual knowledge interchange profile.

20. The method system of claim 9, wherein receiving the request to query the profile database comprises receiving a request by a user to locate information consumed by other individuals at least one individual having similar interests as the user making the request, and wherein executing the received requested query over the profile database comprises: searching the profile database to identify the at least one individual individuals having similar interests as the user making the request, and identifying information consumed by the at least one individual having similar interests from the contents of the individual knowledge interchange profiles.

21. The method system of claim 9, wherein receiving the request to query the profile database comprises receiving a request by a user to locate information consumed by other individuals at least one individual having similar interests as the user making the request, and wherein executing the received requested query over the profile database comprises: searching the profile database to identify the at least one individual having similar interests as the user making the request, and identifying information consumed by the at least one individual having similar interests from the individual knowledge interchange profiles.

22. A computer-readable storage medium having a set of computer instructions which when executed a by a computer causes the computer to perform a method for responding to knowledge interchange queries, the method executed by the set of instructions comprising:

receiving and storing knowledge interchange profiles associated with a plurality of individuals from a plurality of client computers in a profile database, wherein receiving and storing the knowledge interchange profile associated with a plurality of individuals from the plurality of client computers comprises periodically executing a knowledge interchange (KI) plug-in on the plurality of client computers, the KI plug-in being operative to:

monitor user interaction with at least one of the following: an application and a document, and identify at least one item of interest based on the user interaction, wherein the KI plug-in being operative to identify the at least one item of interest based on the user interaction comprises the KI plug in being operative to identify a dwell time on the at least one item of interest and determine a strength of interest associated with the at least one item of interest;

receiving a request to query the profile database;

executing the requested query over the profile database to identify search results; and returning the search results as a response to the query.

* * * * *